Oct. 23, 1951 G. C. TRUSLOW ET AL 2,572,289

APPARATUS FOR FOLDING CLOTH IN PREDETERMINED LENGTHS

Filed June 22, 1949 8 Sheets-Sheet 1

GROVER C. TRUSLOW
and
JOHN T. MACISAAC, JR.,
INVENTORS.

BY Paul Eaton

ATTORNEY.

APPARATUS FOR FOLDING CLOTH IN PREDETERMINED LENGTHS

Filed June 22, 1949 8 Sheets-Sheet 2

GROVER C. TRUSLOW
and
JOHN T. MACISAAC, JR.,
INVENTORS.

BY [signature]

ATTORNEY.

Oct. 23, 1951 G. C. TRUSLOW ET AL 2,572,289

APPARATUS FOR FOLDING CLOTH IN PREDETERMINED LENGTHS

Filed June 22, 1949 8 Sheets-Sheet 3

GROVER C. TRUSLOW
and
JOHN T. MAC ISAAC, JR.,
INVENTORS.

BY [signature]

ATTORNEY.

Oct. 23, 1951 G. C. TRUSLOW ET AL 2,572,289

APPARATUS FOR FOLDING CLOTH IN PREDETERMINED LENGTHS

Filed June 22, 1949 8 Sheets-Sheet 4

GROVER C. TRUSLOW
and
JOHN T. MACISAAC, JR.,
INVENTORS.

BY [signature]

ATTORNEY.

Oct. 23, 1951 G. C. TRUSLOW ET AL 2,572,289

APPARATUS FOR FOLDING CLOTH IN PREDETERMINED LENGTHS

Filed June 22, 1949 8 Sheets-Sheet 5

GROVER C. TRUSLOW
and
JOHN T. MAC ISAAC, JR.,
INVENTORS.

BY Paul Eaton

ATTORNEY.

APPARATUS FOR FOLDING CLOTH IN PREDETERMINED LENGTHS

Filed June 22, 1949

GROVER C. TRUSLOW
and
JOHN T. MACISAAC, JR.,
INVENTORS.

BY

ATTORNEY.

APPARATUS FOR FOLDING CLOTH IN PREDETERMINED LENGTHS

Filed June 22, 1949

GROVER C. TRUSLOW
and
JOHN T. MACISAAC, JR.,
INVENTORS.

BY [signature]

ATTORNEY.

APPARATUS FOR FOLDING CLOTH IN PREDETERMINED LENGTHS

Filed June 22, 1949 8 Sheets-Sheet 8

GROVER C. TRUSLOW
and
JOHN T. MACISAAC, JR.,
INVENTORS.

BY Paul Eaton

ATTORNEY.

Patented Oct. 23, 1951 2,572,289

UNITED STATES PATENT OFFICE 2,572,289

APPARATUS FOR FOLDING CLOTH IN PREDETERMINED LENGTHS

Grover C. Truslow, Charlotte, and John T. MacIsaac, Jr., Spray, N. C., assignors to Marshall Field and Company, Chicago, Ill., a corporation of Illinois Application June 22, 1949, Serial No. 100,564

20 Claims. (Cl. 270—79)

This invention relates to a cloth or web folding apparatus for positioning the cloth in overlapping folds of predetermined and identical length on a table preparatory to the folds of cloth being cut intermediate the points at which they are folded so as to provide pieces or sections of cloth of predetermined length for blankets, bed sheets, and the like. If desired, the transverse cutting of the cloth can be eliminated, when it is desired to cut the stack of cloth into garments.

It is an object of this invention to provide a cloth folding machine comprising a frame in which an automatically vertically movable table is mounted and adjacent opposed ends of which automatically operable toothed grippers are positioned, these toothed grippers being positioned a predetermined distance apart from each other according to the desired distance between the folds of the fabric, and to further provide means for automatically presenting folded edges of the cloth, web, or other pliable material in sheet form to the grippers first at one end of the machine and then at the other end of the machine with the cloth spanning the distance therebetween. The grippers are automatically operable so as to release the folded end of the cloth at one end of the table when the folded end of the cloth at the other end of the table is held by the other set of grippers, and upon the first set of grippers being opened, means are provided to wipe the folded end of the cloth from between the grippers to thus lay the folds of cloth across the table. Other means are provided to automatically cause the table to move downwardly a predetermined amount, according to the thickness of the folds of cloth, as each fold of cloth is laid across the table so the folds of cloth may be drawn tightly across from one set of grippers to the other in a straight line.

It is another object of this invention to provide an apparatus for folding cloth in multiple folds across the top surface of a table comprising a framework on which the table is mounted for vertical movement, intermittently and automatically operable gripper means disposed adjacent opposed ends of the table and a reciprocating pivoted guide member mounted for reciprocation above said table and means for directing fabric, web, cloth or the like to the reciprocating guide member, the path of travel of the reciprocating guide member being such as to present folded ends of the cloth singularly to the opened gripper means after which the gripper means close automatically on the folded end of the cloth and the reciprocating guide member then directs the cloth to the other of the gripper means, whereupon the fabric is released by the first of the gripper means and held by the other of the gripper means. And means are provided for wiping the cloth from the open gripper means upon each movement of the reciprocating guide member across the table and other means are provided to intermittently lower the table so that the cloth is stretched across from one of the sets of gripper jaws to the other in a straight line with each movement across the table by the reciprocating guide member.

Since only a single fold of the cloth is clamped in the gripper means at a time, and since the table moves downwardly upon each layer of cloth being laid across the table, it is thus insured that all of the layers of the cloth will be of identical length. This overcomes one of the worst defects in cloth folding machines heretofore in use since, heretofore, all the folded ends of cloth have been piled one upon the other with clamping bars or the like clamping all the folds simultaneously. This resulted in the middle portion of the cloth; that is, the portions of the cloth between the clamping bars, bowing upwardly, thus gradually increasing the distance between the folded ends of the cloth upon each fold being laid across the table. This is very unsatisfactory, particularly in the event the cloth is to be cut intermediate its folded ends, as in cutting bed sheets and blankets of predetermined identical length. Also, the folded ends of relatively heavy material, such as wool blanket material, would squeeze out from under the clamping bars after only a few folds had been laid across the table, thus limiting the efficiency of the former folding machines to a considerable degree.

Some of the objects of the invention having been stated, other objects will appear as the description proceeds, when taken in connection with the accompanying drawings, in which—

Figure 1:
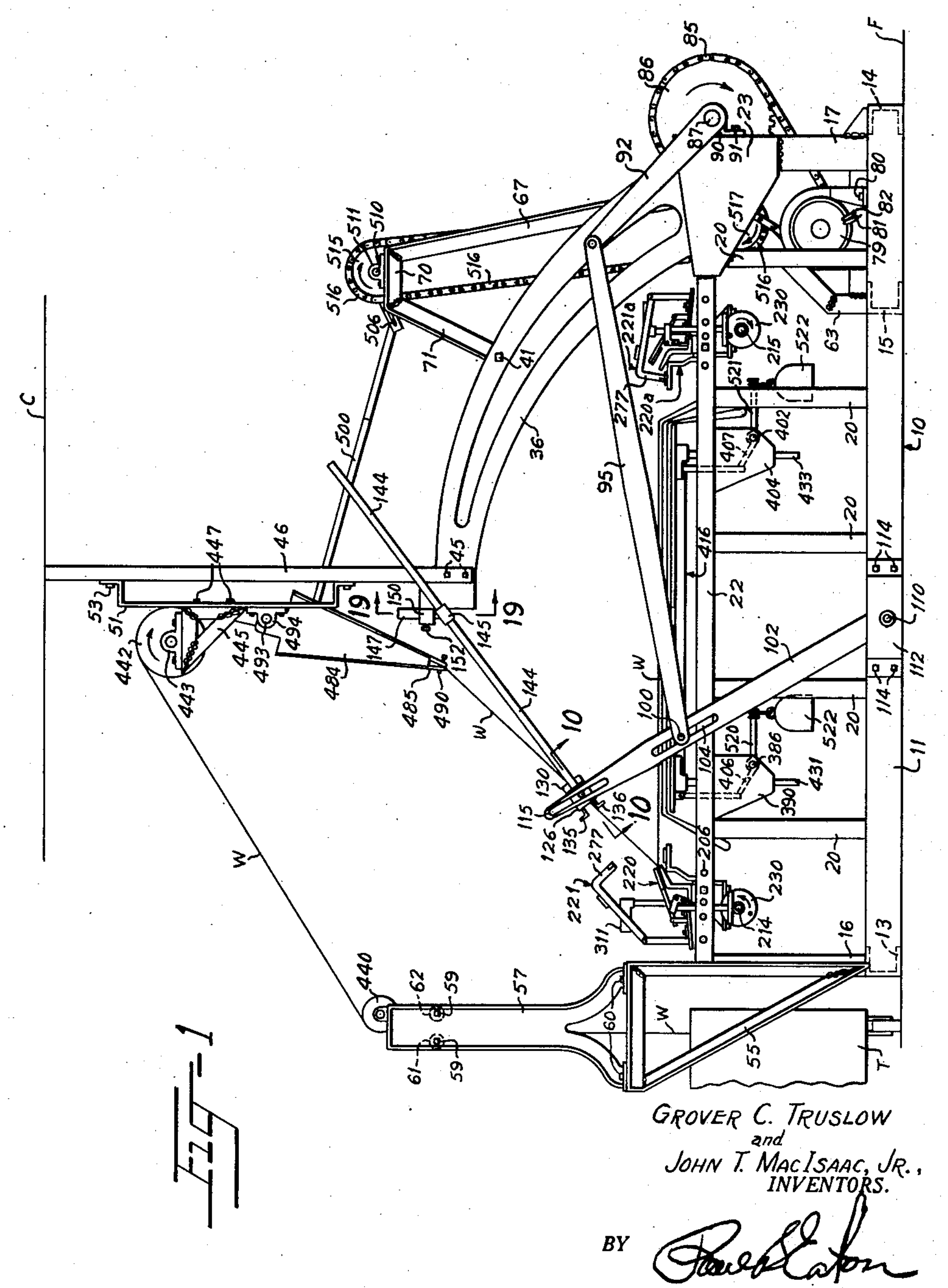
Figure 1 is a side elevation of the apparatus showing a portion of a hand truck adjacent the feed end thereof.

Referring more specifically to the drawings, the numeral 10 broadly designates a frame comprising longitudinally extending lower side frame channel bars 11 and 12 (Figures 1 and 2) which are welded to opposed ends of a channel bar 13 at the feed end of the machine and to opposed ends of a channel bar 14 at the rear end of the machine. For purposes of description, it is to be assumed that the feed or front end of the machine is the left-hand end thereof in Figure 1 and the rear end of the machine is the right-hand end thereof in Figure 1 while the right-hand side of the machine is the side nearest the observer in Figure 1 and the left-hand side is the side nearest the observer in Figure 2.

Also welded at opposed ends to the longitudinally extending channel bars 11 and 12 is a transverse channel bar 15 which is disposed forwardly of the channel bar 14. The lower ends of vertically disposed end frame members 16 and 17 are welded to the upper surfaces of the longitudinally extending channel bar 11 and a plurality of spaced vertically disposed intermediate frame members 20 are also welded at their lower ends to the upper surface of the channel bar 11. The upper ends of the frame members 16 and 20 are welded to a horizontally disposed longitudinally extending angle bar 22 the rear end of which is welded to the vertical surface of the frame member 17.

The frame member 17 extends a short distance upwardly beyond the upper surface of the angle bar 22 and is welded to a reinforcing plate 23 which is polygonal in shape and is also welded at various points to the angle bar 22 and one of the intermediate vertically disposed frame members 20. The lower edge of the plate 23 is also welded to the vertically disposed end frame member 17.

Figures 2, 3:
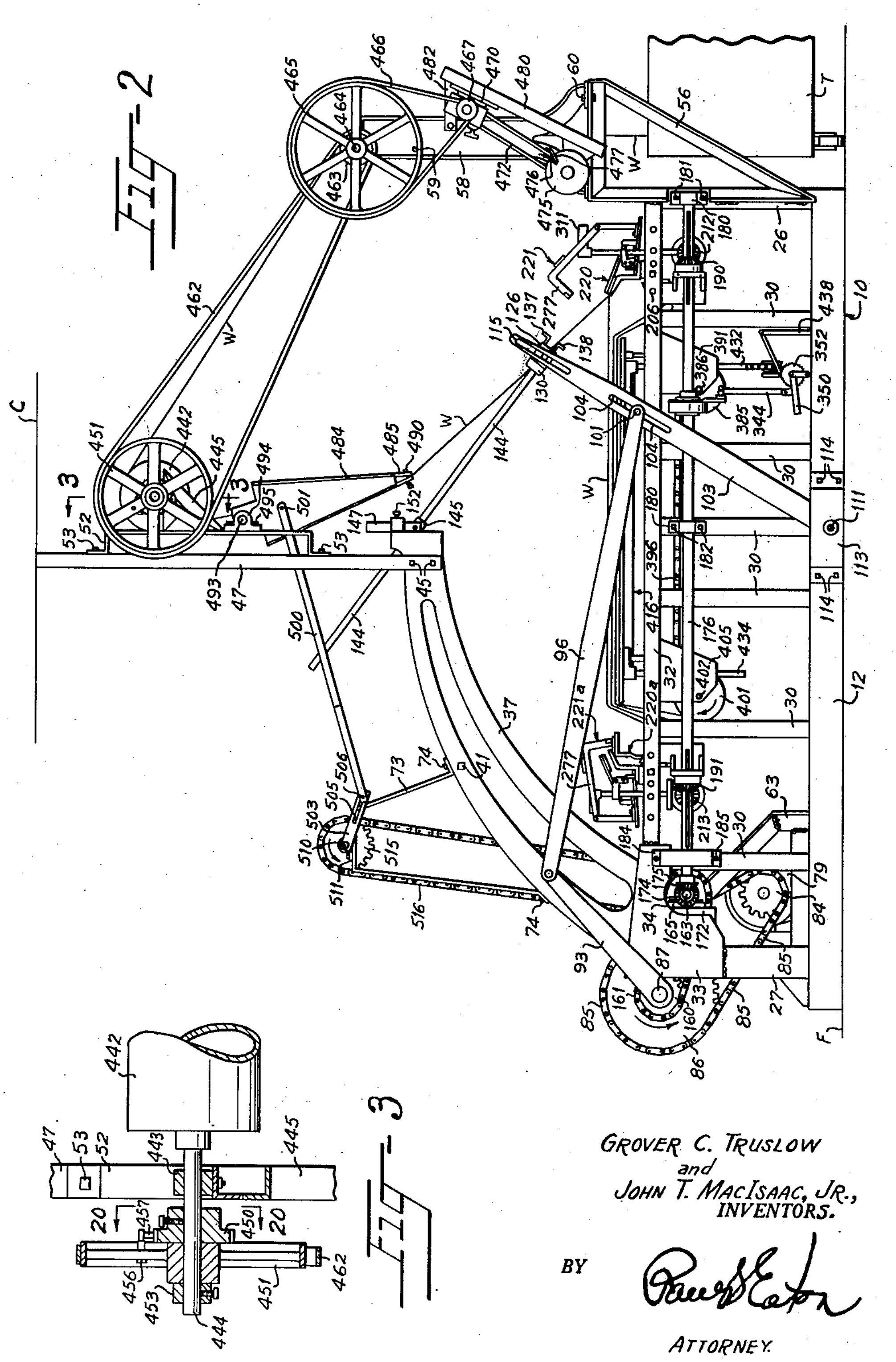
Figure 2 is a side elevation looking at the opposite side from that shown in Figure 1.
Figure 3 is an enlarged vertical sectional view showing a form of overriding clutch mechanism associated with the end of the feed roll 442 nearest the observer in Figure 2 and is taken substantially along the line 3—3 in Figure 2.

Referring to Figure 2 it may be observed that the structure of the frame 10 at the left-hand side of the machine is very similar to the structure at the right-hand side of the machine as shown in Figure 1. The lower ends of vertically disposed end frame members 26 and 27 are welded to the upper surface of the channel bar 12 as well as the lower ends of a plurality of spaced intermediate vertically disposed frame members 30. The upper ends of the frame members 26 and 27 are welded to opposed ends of a horizontally disposed longitudinally extending angle bar 32 which is identical to the angle bar 22 except being opposite hand. A reinforcing plate 33 is welded to the frame members 27, 30 and 32 and has an opening 34 therein through which a shaft to be later described extends.

Figure 5:
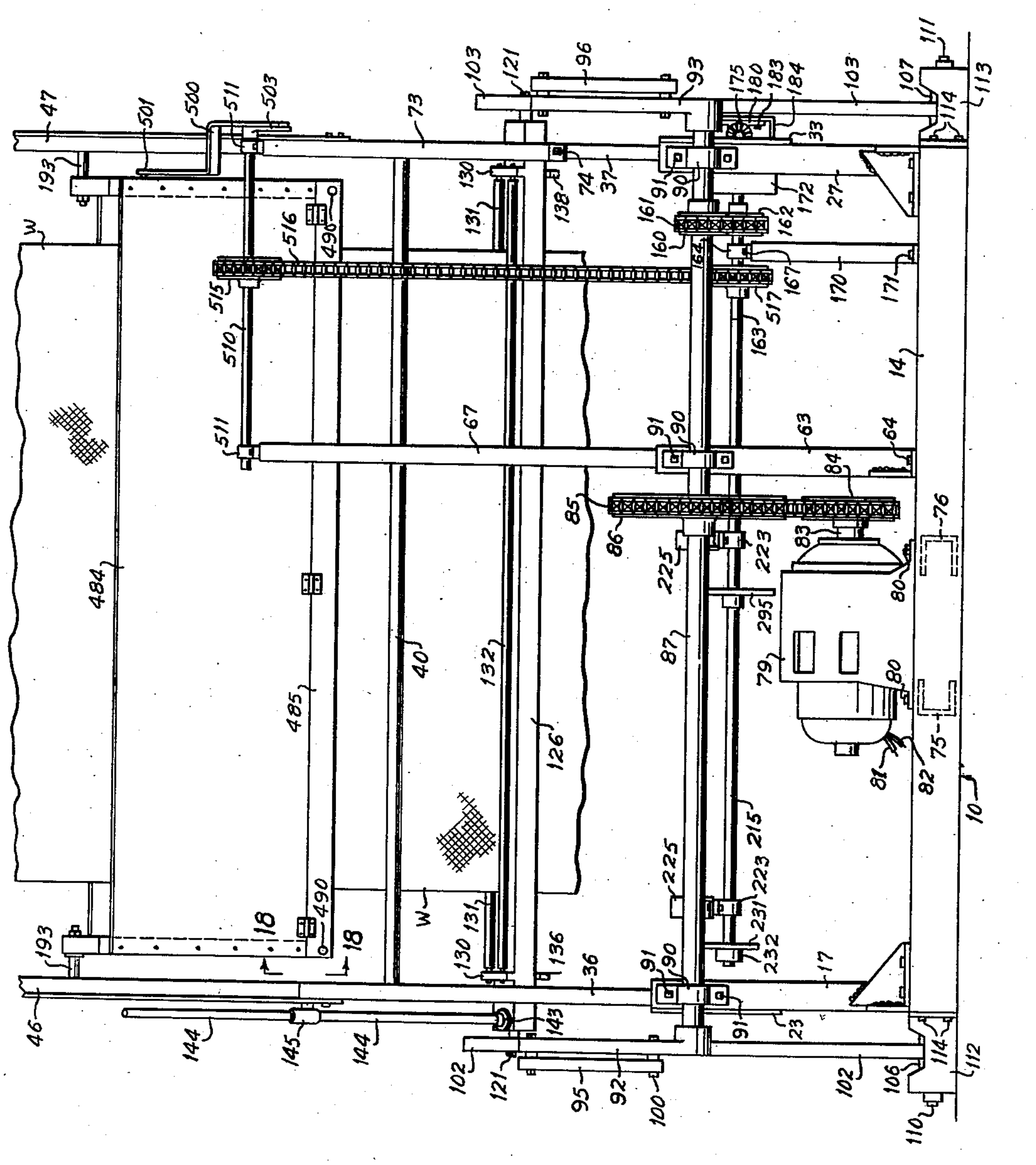
Figure 5 is an enlarged view of the rear end of the machine and looking at the right-hand side of Figure 1 or looking at the left-hand side of Figure 2, but omitting the upper portion thereof and also omitting the table and the gripper devices for purposes of clarity.

Upwardly and forwardly extending curved frame members 36 and 37 are welded at their lower ends to the rear ends of the longitudinally extending angle bars 22 and 32, respectively, and their forward ends terminate in a vertical plane adjacent the middle of a table to be later described. A reinforcing tie rod 40 extends between the upwardly and forwardly curved frame members 36 and 37 and is secured thereto, at opposed ends thereof, by any suitable means such as screws 41 (Figures 1, 2 and 5).

Secured, as by screws 45, to remote surfaces of the curved frame members 36 and 37, and adjacent their front ends, are the lower ends of angle bars 46 and 47, respectively, the upper ends of which are adapted to be secured to a ceiling C of the building in which the machine is disposed. The frame 10 of the machine is adapted to rest on a floor indicated at F.

Opposed ends of outwardly bowed vertically disposed strap iron members 51 and 52 are secured, as by screws 53, to the vertically disposed angle bars 46 and 47, respectively, for supporting shafts to be later described.

Welded to remote surfaces of the vertically disposed end frame members 16 and 26 (Figures 1 and 2) are upwardly extending built-up right angular frame members 55 and 56, respectively, of welded construction, to the upper ends of which the lower ends of standards 57 and 58, respectively are secured as by screws 60. An upright intermediate frame member 63, of built-up welded construction, is secured intermediate the ends of the transverse channel bars 14 and 15, as by screws 64, only one of which is shown in Figure 5. Welded to the upper end of the upright frame member 63 is the lower end of an angle bar 67 (Figures 1 and 5) which extends upwardly and forwardly, at a slight angle relative to the vertical, and has a horizontally disposed portion 70 connected thereto, to the front end of which a downwardly and forwardly extending angularly disposed portion 71 is connected. This portion 71 is suitably secured to the tie rod 40.

An inverted substantially U-shaped strap iron member 73, whose upper end is disposed in the same horizontal plane as the portion 70 of the angle bar 67 (Figures 1, 2 and 5) is secured as by screws 74 to the upper surface of the curved frame member 37 (Figure 2).

Welded at opposite ends to the transverse channel bars 14 and 15 is a pair of longitudinally extending channel bars 75 and 76 (Figure 5) on which an electric motor 79 is secured as by screws 80. The electric motor 79 has electric wires 81 and 82 extending therefrom to a suitable source of electrical energy not shown. The electric motor 79 has a shaft 83 extending therefrom (Figure 5) on which a sprocket wheel 84 is fixedly mounted.

The sprocket wheel 84 has a sprocket chain 85 mounted thereon which extends upwardly and is mounted on a substantially larger sprocket wheel 86 fixedly mounted on a transverse drive shaft 87. The transverse shaft 87 is rotatably mounted in bearing blocks 90 secured, as by screws 91, to the vertically disposed rear end frame members 17 and 27 and the built-up frame member 63 (Figure 5). Crank arms 92 and 93 are fixedly mounted on opposed ends of the drive shaft 87 and have, pivotally connected to their free ends, links 95 and 96, respectively, which extend forwardly and the front ends of which are pivotally connected as at 100 and 101, respectively, to pivoted arms 102 and 103.

Each of the pivoted arms 102 and 103 has a longitudinally extending slot 104 therein (Figures 1 and 2) to provide for adjustment of the front ends of the links 95 and 96 relative to the pivoted arms 102 and 103 for increasing or decreasing the length of stroke of the free ends of the pivoted arms 102 and 103. The lower ends of the pivoted arms 102 and 103 have hub portions 106 and 107 integral therewith (Figures 4 and 5) which are oscillatably mounted on shafts 110 and 111, respectively, the proximate ends of which are fixedly mounted in the longitudinally extending channel bars 11 and 12, respectively. The remote ends of the shafts 110 and 111 are fixedly mounted in substantially U-shaped brackets 112 and 113, respectively, secured as by screws 114 to the remote surfaces of the longitudinally extending channel bars 11 and 12 of the frame 10.

Figure 11:
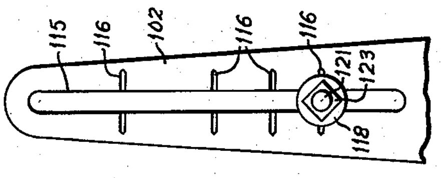
Figure 11 is an elevation showing the free end of the arm 103 which with arm 102 adjustably supports the folding bar.
Figure 10:
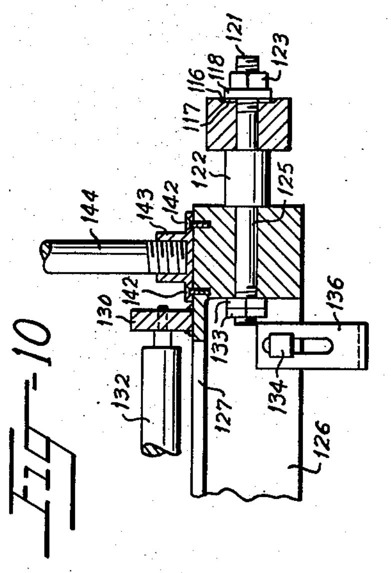
Figure 10 is an enlarged detail showing the manner in which the folding bar is connected to the guide means therefor and showing parts in section and is taken substantially along the line 10—10 in Figure 1.

The upper ends of the pivoted arms 102 and 103 are identical and, by referring to Figures 10 and 11, it will be observed that the upper end of the pivoted arm 102 has a longitudinally extending slot 115 therein and the outer surfaces of the upper ends of the pivoted arms 102 and 103 are provided with a plurality of unevenly spaced transverse grooves 116 which are spaced apart from each other according to the desired distance between the folded ends of the cloth to be later described. These transverse grooves 116 are cut adjacent opposed edges of the adjustment slot 115 and any one of these grooves 116 is adapted to receive projecting portions 117 (Figure 10) integral with a washer 118 loosely mounted on a restricted threaded portion 121 of a stub shaft 122 and one of these washers 118 being secured against each of the opposed surfaces of the pivoted arms 102 and 103 as by a nut 123.

Each of the stub shafts 122 has a restricted portion 125 integral therewith on which the closed opposed ends of a cloth guiding and folding bar or member 126, which is channel-shaped in cross section for substantially its entire length, are oscillatably mounted. It will be noted in Figure 5 that this cloth guiding and folding bar 126 extends the full width of the machine frame 10. The web portion of the guiding and folding bar 126 has a longitudinally extending slot 127 therein, the opposed ends of which terminate a short distance from the remote ends of the bar 126. Adjacent opposed ends of the slot 127 are outwardly projecting bearing portions 130 which may be integral with the bar 126 but are shown in Figure 10 as being welded to the web portion of the bar 126.

Figures 6, 7, 8:
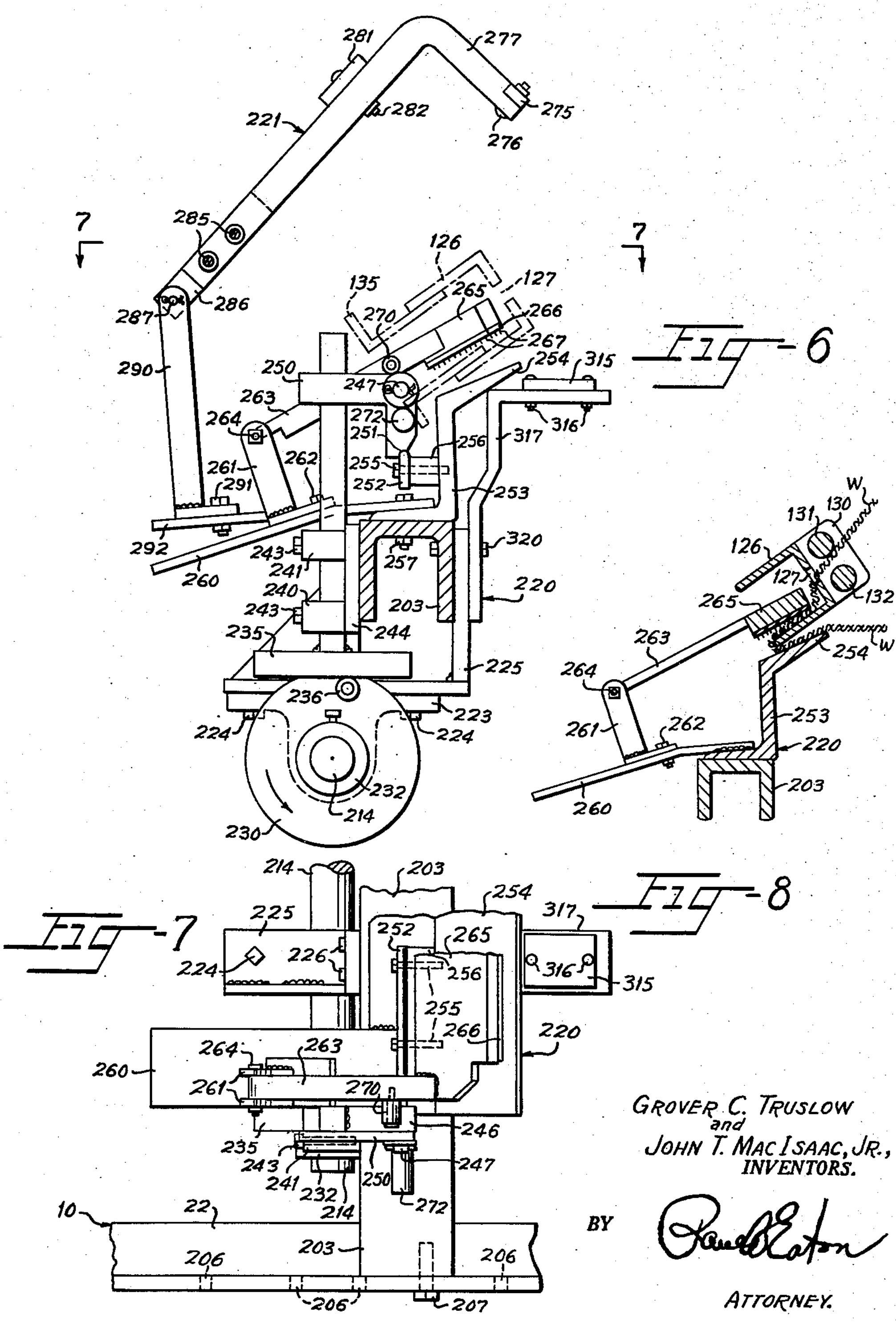
Figure 6 is an enlarged elevation of the gripper means adjacent the feed end of the apparatus but showing the supporting member therefor in cross section and is taken looking substantially along the line 6—6 in Figure 4.
Figure 7 is a top plan view showing one end of the gripper means shown in Figure 6 and is taken looking down substantially along the line 7—7 in Figure 6 and showing one of the side frame members to which the supporting member for the gripper means is secured.
Figure 8 is an enlarged vertical sectional view showing the manner in which the fabric is delivered to the gripper means by the reciprocating guiding and folding bar and is taken substantially along the line 8—8 in Figure 4.
Figure 9:
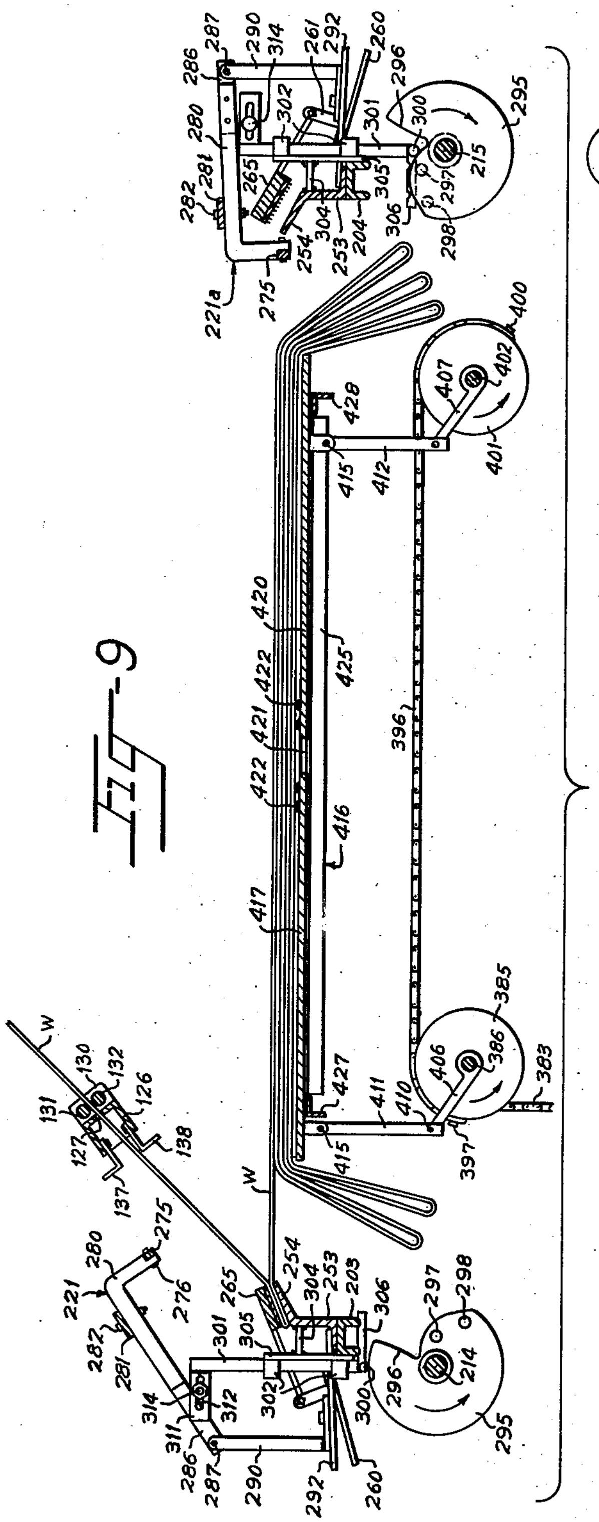
Figure 9 is a longitudinal vertical sectional view taken substantially along the line 9—9 in Figure 4 and showing many of the parts schematically and also including the table on which the cloth is folded.

Spaced rods 131 and 132 are rotatably mounted at opposite ends thereof in the bearing portions 130 of the bar 126 and the fabric or the like, to be later described, is adapted to pass between the rollers 131 and 132 and through the slot 127 and outwardly through the open end of the channel-shaped bar 126 (Figures 8 and 9). It will be noted in Figure 10 that the portion 125 of the stub shaft 122 has lock nuts 133 threadably mounted on its inner end which are provided to prevent endwise movement of the bar 126 on the stub shaft 122. Secured to proximate sides of the flanges of the guiding and folding bar 126, as by screws 134 (Figures 9 and 10) are angle clips 135 to 138, inclusive, the angle clips 135 to 136 being mounted at the end nearest the observer in Figure 1 and the angle clips 137 and 138 being mounted at the end of the bar 126 nearest the observer in Figure 2.

Figure 19:
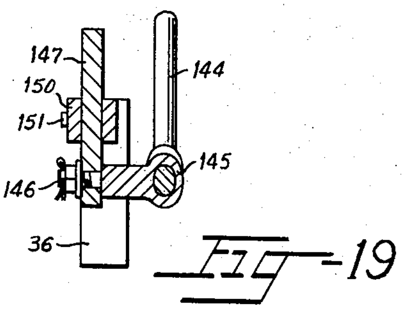
Figure 19 is an enlarged vertical sectional view taken substantially along the line 19—19 in Figure 1 and showing the manner in which the guide rod for the guiding and folding bar is connected to the frame of the machine.

Secured, as by screws 142, to the web of the bar 126 (Figure 10) is a pipe flange 143 in which the lower end of a guide rod 144 is threadably imbedded, there being only one of these guide rods 144 which is disposed on the side of the machine nearest the observer in Figure 1. Referring to Figures 1 and 19, it will be observed that the guide rod 144 slidably penetrates a cuff member 145 oscillatably mounted, as at 146 (Figure 19), in the lower portion of a vertically disposed bar 147, which is preferably rectangular in cross section and which is mounted for vertical adjustment in a guide block 150 secured, as by screws 151, only one of which is shown in Figure 19, to the upper end of the curved frame member 36 heretofore described. A set screw 152 threadably penetrates the guide block 150 and bears against the vertically disposed bar 147 to secure the same in adjusted position (Figures 1 and 2). This guide block 150 is adjustable so as to accommodate changes in adjustment of the guiding and folding bar 126 relative to the pivoted arms 102 and 103 and the links 95 and 96. These members are all adjustable according to the desired distance between the folded ends of cloth, web or the like, which is indicated at W in Figures 1, 2, 4, 5 and 9.

Referring to Figures 2 and 5, it will be observed that there is a sprocket wheel 160 fixedly mounted on the drive shaft 87, near its right-hand end in Figure 5, which has a sprocket chain 161 mounted thereon, this sprocket chain 161 also being mounted on a sprocket wheel 162 fixedly mounted on a jack shaft 163. The jack shaft 163 is rotatably mounted in bearing blocks 164 and 165, the bearing block 164 being secured, as by screws 167, to the upper end of a standard 170 secured at its lower end to the upper surface of the transverse frame channel bar 14 of the frame 10, as by screws 171, only one of which is shown in Figure 5.

The bearing block 165 is suitably secured to an angle bar 172 (Figure 2) which is welded to the inner surface of the plate 33 heretofore described. The jack shaft 163 extends through the opening 34 in plate 33 and a miter gear 174 (Figure 2) is fixedly mounted on the outer end of the shaft 163 and meshes with a miter gear 175 fixedly mounted on the rear end of a longitudinally extending shaft 176. The longitudinally extending shaft 176 is rotatably mounted in bearing blocks 180, there being three of these bearing blocks 180, one of which is secured as by screws 181 to the front vertically disposed end frame member 26 and an intermediate one of which is secured, as by screws 182, to the centermost of the intermediate vertically disposed frame members 30 in Figure 2, and the other of which is secured as by screws 183 (Figure 5) to a substantially U-shaped strap iron bracket 184 secured, as by screws 185, to the rearmost of the intermediate frame members 30 in Figure 2.

A pair of spaced miter gears 190 and 191 are keyed on the shaft 176 and are mounted in an identical manner for horizontal sliding adjustment on the shaft 176. Since both of these miter gears 190 and 191 are mounted in the same manner, only a detailed description will be given of the manner in which the miter gear 190 is mounted and in the mounting for the miter gear 191 like parts to the parts associated with the miter gear 190 will bear the same reference characters.

Figures 12, 13, 14, 15, 16:
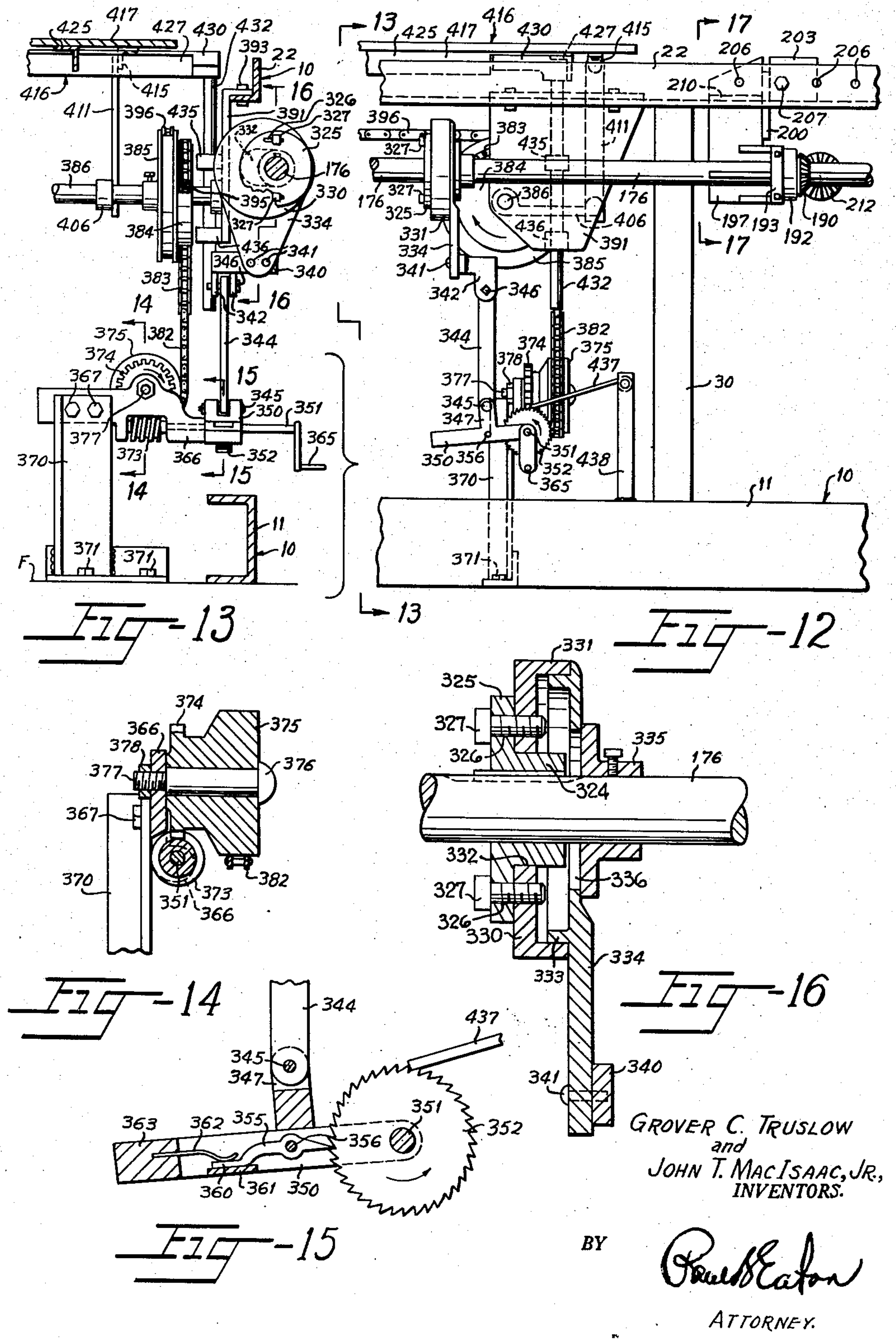
Figure 12 is an enlarged elevation of parts disposed adjacent the lower right-hand portion of Figure 2 and showing the means for controlling the lowering and raising of the table on which the cloth is deposited as it is folded.
Figure 13 is a vertical sectional view taken substantially along the line 13—13 in Figure 12.
Figure 14 is an enlarged vertical sectional view through a worm and worm gear mechanism and is taken along the line 14—14 in Figure 13.
Figure 15 is an enlarged vertical sectional view taken substantially along the line 15—15 in Figure 13.
Figure 16 is an enlarged vertical sectional view taken substantially along the line 16—16 in Figure 13 and showing the manner in which the eccentric is mounted for driving the means for intermittently lowering the table.
Figure 17:
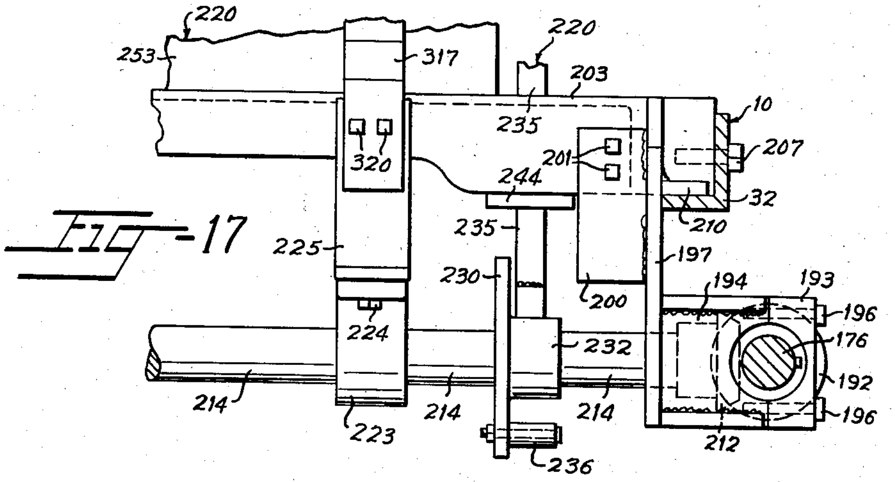
Figure 17 is an enlarged elevation, with parts in section, taken substantially along the line 17—17 in Figure 12.

Referring to Figures 2, 12 and 17, it will be observed that the miter gear 190 has a spacing collar 192 mounted on its hub portion which slidably and rotatably engages the outer and inner portions 193 and 194, respectively, of a split bearing which is partially slidably penetrated by the hub of the miter gear 190. The outer portion or cap 193 of the split bearing is secured to the inner portion 194 thereof as by cap screws 196. The inner end of the portion 194 of the split bearing is welded to the lower portion of a vertically disposed plate 197 having a second vertically disposed plate 200 welded to the inner surface thereof which is secured as by screws 201 to the vertical surface of an inverted channel bar frame member 203, opposed ends of which rest on the upper surfaces of the horizontal flanges of the longitudinally extending angle bars 22 and 32 of the frame 10 near the front end of the machine, there being a similar transverse channel bar 204 in the same position relative to the miter gear 191 at the rear of the machine (Figure 9).

The vertical legs of the longitudinally extending angle bars 22 and 32 of the frame 10 are each provided with a plurality of spaced bores 206 disposed adjacent opposed ends of each of the transversely disposed channel bars 203 and 204 and any one of which is adapted to be slidably penetrated by suitable screws 207 for securing opposed ends of channel bars 203 and 204 in adjusted position so they are disposed in proper spaced relation to each other according to the distance between the folded ends of the cloth W.

The vertically disposed plate 197 in Figure 17 also has an outwardly projecting plate member 210 welded thereto which is adapted to slidably engage the upper surface of the horizontal leg of the longitudinally extending angle bar 32. This completes the description of the manner in which the miter gears 190 and 191 are adjustably mounted on the shaft 176.

The miter gears 190 and 191 mesh with miter gears 212 and 213, respectively, fixedly mounted on the ends of transverse shafts 214 and 215, respectively (Figure 2 and 9), which are disposed a substantial distance below the lower edges of the channel bars 203 and 204, respectively (Figures 1, 2, 4, 5 and 9).

It is thus seen that the longitudinally extending shaft 176 (Figure 2) transmits rotation to the transverse shafts 214 and 215 and the reason for mounting the miter gears 190 and 191 so they will slide on the shaft 176 with the transverse channel bars 203 and 204 is due to the fact that the transverse shafts 214 and 215 must remain in fixed relation to the channel bars 203 and 204, respectively, inasmuch as these shafts 214 and 215 are instrumental in transmitting operation to the movable parts of gripper units broadly designated at 220 and 220*a*, respectively, and which are supported by the transverse channel bars 203 and 204, respectively. These transverse shafts 214 and 215 are also instrumental in transmitting motion to wiper units broadly designated at 221 and 221*a*.

Now, since the manner in which the transverse shafts 214 and 215 are mounted as well as the structure of the gripper units 220 and 220*a* and the wiper units 221 and 221*a* are identical, and have identical operating means, a detailed description of the gripper unit 220 and of the wiper unit 221 will be given only and the same reference characters will apply to like parts associated with both the gripper units 220 and 220*a* and to like parts associated with both of the wiper units 221 and 221*a*.

Figure 4:
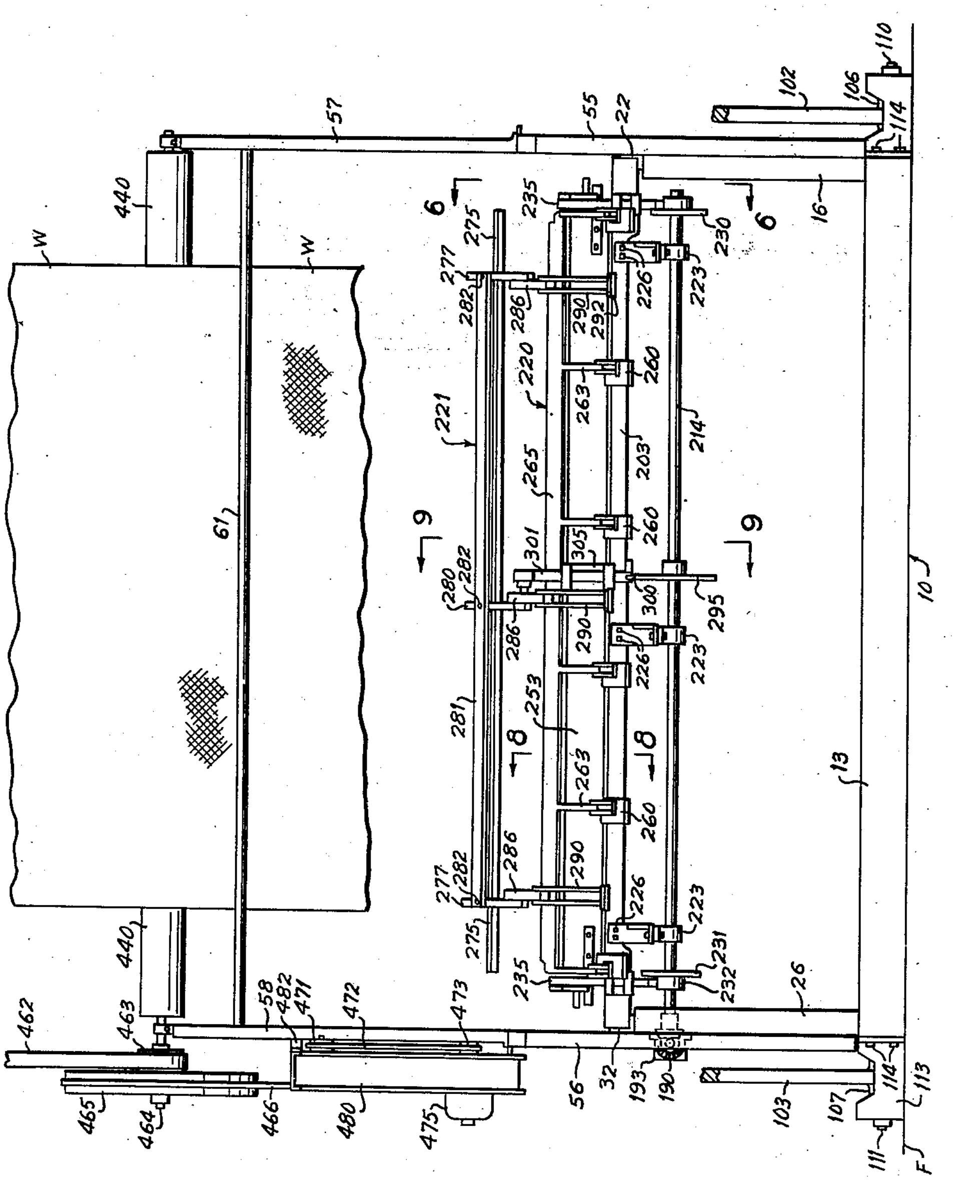
Figure 4 is an enlarged elevation looking at the front end of the machine but omitting the upper portion thereof and also omitting the table and the guiding and folding means for the cloth.

Referring to Figures 4 and 6, it may be observed that the transverse shaft 214 is rotatably mounted in a plurality of spaced bearing blocks 223 secured, as by screws 224, to the lower surface of a bracket 225, of welded construction, depending from and secured to the transverse channel bar 203 by any suitable means such as screws 226. Mounted adjacent opposed ends of the transverse shaft 214 in Figure 4 are cam wheels 230 and 231 which are fixedly mounted on the shaft 214 and each of which has a hub portion 232 integral therewith which is intermittently engaged by the lower surface of an inverted T-shaped member 235 of welded construction. Each of the cam wheels 230 and 231 also has a roller 236 mounted thereon to one side of its axis and which is adapted to intermittently engage the lower surface of the T-shaped member 235 for raising and lowering the same.

The vertical leg of each of the inverted T-shaped members 235 is mounted for vertical sliding movement in suitable guide blocks 240 and 241 secured, as by screws 243, to a plate 244 (Figure 6) which is also slidably penetrated by the uppermost of the screws 243 and which is threadably imbedded in the vertical flange of the inverted transverse channel bar 203. The cam wheels 230 and 231 and the inverted T-shaped members 235 are parts of each of the gripper units 220 and 220*a*, which are identical except being opposite hand.

The gripper unit 220 also comprises a relatively short horizontally disposed bar 246 welded at its left-hand end in Figure 7 to the vertical leg of the inverted T-shaped member 235 and which has a stub shaft 247 extending outwardly therefrom and on which an inverted substantially L-shaped member 250 is oscillatably mounted. The horizontal leg of the inverted L-shaped member 250 is substantially longer than the vertical leg thereof and its weight thus normally urges the inverted L-shaped member 250 in a counterclockwise direction in Figure 6. The lower end of the vertical leg of the L-shaped member 250 has a notch 251 therein which is adapted to be engaged by a rounded upper edge of a horizontally disposed bar 252 which is secured, as by screws 255, to the vertical face of a web portion 253 of a transverse stationary gripper jaw 254 which is substantially Z-shaped in cross section.

The screws 255 also slidably penetrate a suitable spacer block 256 disposed between the bar 252 and the web portion 253 of the stationary gripper jaw 254. The stationary gripper jaw is secured to the upper surface of the transversely disposed channel bar 203 as by bolts 257.

These bolts 257 also secure the inner ends of a plurality of strap iron members 260 to the upper surface of the lower flange of the stationary jaw 254 and to the upper surfaces of which suitable bearing blocks 261 are secured as by screws 262. Each of these bearing blocks 261 has the lower free end of an arm 263 oscillatably connected thereto as at 264, there being six of these bars 263 shown in Figure 4.

The upper ends of the bars 263 are connected to a common transversely disposed upper or movable jaw member 265. A strip of leather 266 or other resilient friction material extends the length of the movable gripper jaw 265 and is suitably secured to the lower surface thereof as shown in Figures 6 and 8. However, before this strip 266 is secured to the lower surface of the gripper jaw 265, suitable staples 267 or the like are driven through the strip of material 266 so that the pointed ends thereof serve as teeth projecting from the lower surface of the member 266 when applied to the lower surface of the movable gripper jaw 265.

The endmost of the arms 263 welded to the movable gripper jaw 265 in Figure 4 and the arm 263 nearest the observer in Figure 6 are preferably of greater thickness than the arms 263 disposed therebetween and these endmost arms 263 are provided with suitable rollers 270 which are adapted to be engaged by the upper surfaces of the bars 246 projecting from the inverted T-shaped members 235 adjacent opposed ends of the upper and lower gripper jaws 265 and 254, respectively, in Figure 4.

Now, in order to insure that the inverted T-shaped members 235 at opposed ends of each of the gripper units 220 and 220*a* are moved downwardly by gravity upon the folded portions of the cloth W being moved between the set of jaws 265 and 254 associated with each of the gripper units 220 and 220*a* by the bar 126 as shown in Figure 8, each of the inverted L-shaped members 250 has a pin 272 projecting outwardly therefrom (Figures 6 and 7) and the pins 272 at the opposite ends of the gripper unit 220 are adapted to be engaged by the angle chips 136 and 138. Upon the guiding and folding bar 126 moving from the front of the machine to the jaws 265 and 254 associated with the gripper unit 220*a* at the rear of the machine, a folded portion of the cloth W will be inserted between the jaws 254 and 265 associated with the gripper unit 220*a* and then the angle clips 135 and 137 will move into engagement with the pins 272 at opposed ends of the gripper unit 220*a*.

Now, when these angle clips 135 to 138, inclusive, engage the pins 272 at opposed ends of either of the gripper units 220 or 220*a*, the inverted L-shaped members 250 are caused to partially rotate, in a clockwise direction in Figure 6 for example, and it is thus seen that the notched portion 261 will move out of engagement with the bar 252 and will permit the associated inverted T-shaped members 235 to fall downwardly by gravity, it being understood that at this time the cam follower or roller 236 will be in a lower position than the horizontal plane of the upper surface of the hub 232 on the cam wheel 230 and 231.

When the inverted T-shaped members 235 of either of the units 2220 or 220*a* move downwardly, the movable gripper jaw 265 will be permitted to fall downwardly, by gravity, since it is normally held in a raised position by the bar 246 engaging the roller 270 at opposed ends of either of the gripper units 220 or 220*a*.

Oscillation is imparted to the pivoted arms 102 and 103 in timed relation to the vertical movement of the inverted T-shaped members 235 at the front and rear of the machine so that the bars 246 on the inverted T-shaped members 235 will engage the rollers 270 at opposed ends of the vertically movable jaws 265, at the rear of the machine for instance, prior to the lower flange of the guiding and folding member 126 moving between the gripper jaws 265 and 254.

Immediately following the opening of the jaws 254 and 265 and prior to the lower flange of the folding and guiding member 126 moving between the jaws 254 and 265, the folded end of the cloth W which was previously placed between the jaws 254 and 265 is wiped clear of the jaws by a wiper bar 275, there being one of these wiper bars 275 at the front and one at the rear of the machine and which are a part of the wiper units 221 and 221*a*, respectively. Referring to Figures 4 and 6, it will be observed that opposed end portions of the wiper bar 275 are secured as by bolts 276 to the free ends of L-shaped arms or members 277 and the bar 275 is supported midway of its length on a similar L-shaped arm 280. These L-shaped arms 277 and 280 are also tied together by a frame member 281 secured to the arms 277 and 280 as by bolts 282 (Figure 6).

Each of the L-shaped members 277 and 280 is secured as by screws 285 (Figure 6) to an arm 286 oscillatably mounted as at 287 on the upper end of a standard 290. The lower end of each of the standards 290 is secured as by a bolt 291 to a strap iron member 292 which extends inwardly and is also secured, by some of the bo ts 257 heretofore described, to the upper surface of the lower flange of the stationary jaw 254 associated with the gripper units 220 and 220*a*.

In order to raise the wiper bar 275 after it has withdrawn the folded end of the cloth W from between the associated gripper jaws 254 and 265, each of the transverse shafts 214 and 215 has a cam wheel 295 fixedly mounted thereon and disposed substantially midway of the shafts 214 and 215. These cam wheels 295 are identical on both of the shafts 214 and 215 except being opposite hand as shown in Figure 9. The cam wheel 295 on shaft 214 will be described only.

The cam wheel 295 is substantially circular with the exception that it has a notch 296 cut in its periphery and a pair of pins 297 and 298 project from the vertical surface of each of the cam wheels 295 adjacent the trailing edge of the notch 296 for purposes to be later described.

The peripheral edge of the cam wheel 295 normally engages a cam follower 300 carried by the lower end of a vertically disposed bar 301 which is preferably rectangular in cross section and which is mounted for vertical sliding movement in guide blocks 302 welded to a plate 305 which has one end of an inwardly extending portion 304 welded thereto, the other end of which is welded to the web 253 of the stationary jaw 254 of the gripper unit 220, there being an identical structure associated with the gripper unit 220a in Figure 9.

The lower end of the vertically movable bar 301 also has an inwardly extending arm 306 integral therewith which is offset relative to the cam follower 300 and is adapted to be engaged by the pins 297 and 298 on the face of the cam wheel 295 upon rotation of the cam wheel to thereby promote a smooth elevating action when the member 301 is moved upwardly. The vertically disposed bar 301 has an outwardly extending arm 311 (Figure 9) welded thereto which is provided with a slot 312 slidably penetrated by an adjustment bolt 314 which projects into the vertical plane of the L-shaped member 280 and engages the same upon being moved upwardly to thus move the arm 280 from a lowered to a raised position.

Upon the cam wheel 295 moving so its high point moves out of engagement with the cam follower 300, the cam follower 300 will fall into the notch 296 and will thus permit the wiper bar 275 associated therewith to fall downwardly, by gravity, and it will be noted in Figure 4 that opposed ends of the wiper bar 275 extend a substantial distance beyond the remote surfaces of the ends of the L-shaped members 277 and these opposed ends are adapted to fall against shock absorbing pads 315, which may be of any resilient material such as sponge rubber and the like, and only one of which is shown in Figure 6. These shock absorbing pads 315 are each secured as by bolts 316 to an angle bracket 317 which extends downwardly and is secured, by any suitable means such as a bolt 320, to the vertical flange of either of the channel bars 203 or 204, as the case may be. This bolt 320 slidably penetrates one of the brackets 225 and thus assists in securing the bracket 225 to the channel bar 203 as shown in Figure 6. As the wiper bar 275 falls downwardly, it engages the cloth, which may remain impaled on the pins 267 extending from the upper jaw 265 when the jaw was raised in the manner heretofore described, and thus wipes the cloth from pins 267 and from between the jaws 254 and 267. The folded end of the cloth will then fall and depend loosely from the table, to be later described, as shown in Figure 9. This completes the description of the gripper units 220 and 220a and the wiper units 221 and 221a.

Now, referring to Figure 2, it will be observed that the shaft 176 also has fixedly mounted thereon the hub 324 of a disk 325 (Figures 12, 13 and 16). The disk 325 has adjustment slots 326 therein which are slidably penetrated by screws 327 which are threadably imbedded in the vertical surface of an eccentric circular member 330. The eccentric circular member 330 has an annular flange 331 within which an annularly flanged portion 333 of a depending member or arm 334 is slidably and rotatably mounted so as to permit the eccentric 330 to rotate with the shaft 176 and which will thus cause the depending member 334 to reciprocate in a vertical plane in Figures 12, 13 and 16. The eccentric 330 also has a slot 332 therein which is loosely penetrated by the hub 324 of disk 325 and, by loosening the screws 327, the eccentric 330 may be adjusted as to eccentricity relative to the disk 325 and the shaft 176 according to the desired stroke to be imparted to the depending member 334. The length of stroke of the member 334 controls the amount that the cloth supporting table, to be later described, is lowered upon each stroke of the cloth guiding and folding bar 126 to thus accommodate varying thicknesses of cloth W. The heavier or thicker the cloth, the further the disk 325 is positioned to one side of the center of the eccentric 330. The function of this apparatus will become more apparent as the description proceeds.

A suitable hub member 335 is also fixedly mounted on the shaft 176 (Figures 12 and 16) and is slidably and rotatably engaged by the outer surface of the upper portion of the depending arm 334 to thus confine the flanged portion 333 thereof within the flange portion 331 of the eccentric 330. This upper portion has a large opening 336 therein which is loosely penetrated by the shaft 176 (Figure 16) to allow for adjustment of the eccentric 330 in the manner heretofore described.

The lower end of the depending arm 334 has a bracket 340 fixedly connected thereto as by screws 341. This bracket 340 has depending spaced ears 342 welded thereto which straddle the upper end of a link 344 which is slidably and pivotally mounted on a screw 346 mounted in the depending ears 342 of the bracket 340 (Figures 12, 13 and 15).

The lower end of the link 344 is pivotally connected, as at 345 to the upper end of an upwardly projecting portion 347 of a pawl-carrying arm 350. The pawl-carrying arm 350 is oscillatably mounted on a shaft 351 (Figures 13 and 15) on which a ratchet wheel 352 is also fixedly mounted.

The pawl-carrying arm 350 has a dog or ratchet pawl 355 oscillatably mounted therein as at 356 (Figure 15) and this dog or ratchet pawl 355 normally engages the ratchet wheel 352. The ratchet pawl 355 has a tail portion 360 integral therewith which is normally biased against a transverse bar 361 in the pawl-carrying arm 350 by a leaf spring member 362 projecting from a transverse portion 363 in the pawl-carrying arm 350.

One end of the shaft 351 has a suitable handle 365 fixedly mounted thereon for manual manipulation of the shaft 351 for adjustment of the table, to be later described which supports the folded cloth W, which is necessary upon starting to fold a new batch of cloth. This shaft 351 is rotatably mounted in a bracket 366 secured as by screws 367 to the upper end of a standard 370, of welded construction, whose lower end is secured, as by screws 371, to the floor F on which the frame 10 is resting.

The shaft 351 has a worm 373 fixedly mounted thereon which meshes with a worm gear 374 which is an integral part of a flat surfaced pulley 375 (Figure 14) and which is rotatably mounted on a shoulder bolt 376 having a restricted threaded portion 377 which slidably penetrates the bracket 366 and is secured therein by a nut 378 (Figure 14).

The lower end of a link belt 382 is connected to the periphery of the pulley 375 and extends upwardly therefrom and is connected to the lower end of a second link belt 383 (Figures 12 and 13) turned at right angles to the bolt 382 and which partially surrounds a hub portion 384 integral with a grooved pulley 385. The pulley 385 is fixedly mounted on a transverse shaft 386 which extends from one side of the frame 10 to the other and is rotatably mounted in vertically disposed plates 390 and 391 depending from the longitudinally extending angle bars 22 and 32, respectively (Figures 1 and 2), and being secured thereto as by screws 393 (Figures 12 and 13).

The upper end of the link belt 383 is secured on the hub portion 384 of the grooved pulley 385 as by a screw 395. A third link belt 396 (Figures 9, 12 and 13) is secured, as at 397 in Figure 9, to the grooved pulley 385. This link belt 396 extends rearwardly from the pulley 385 and its other end is secured as at 400 to a grooved pulley 401. The grooved pulley 401 is fixedly mounted on a rear transverse shaft 402, which is identical to the front shaft 386 and is rotatably mounted in vertically disposed plates 404 and 405 (Figures 1 and 2) which are mounted in the same manner as the plates 391 shown in Figures 12 and 13.

The shafts 386 and 402 each have a pair of spaced arms 406 and 407, respectively, there being one fixedly mounted near each of their opposite ends and the free ends of which are pivotally connected as at 410 to the lower ends of vertically disposed links 411 and 412, respectively (Figure 9). The upper ends of the links 411 and 412 are pivotally connected as at 415, to the lower surface of a cloth supporting table broadly designated at 416.

Figures 20, 22:
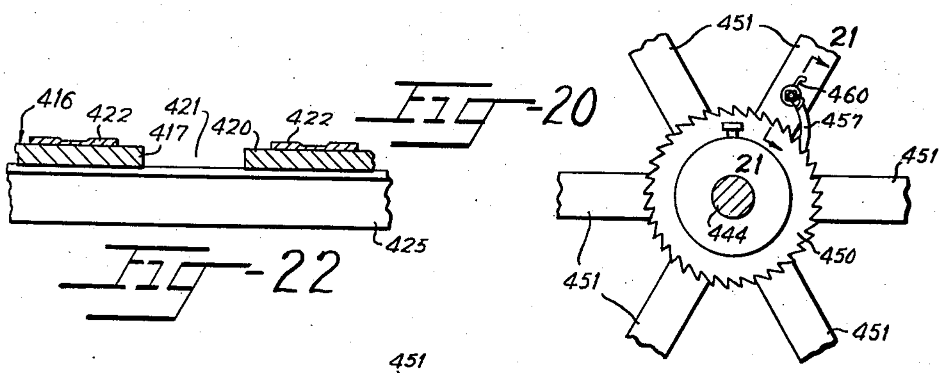
Figure 20 is an enlarged elevation with a shaft in section showing the central portion of the pulley and being taken looking substantially along the line 20—20 in Figure 3.
Figure 22 is an enlarged vertical sectional view of the central portion of the table 416 as shown in Figure 9.

This table 416 may be provided with a table top of a single piece of material; however, in the drawings there is shown in Figures 9 and 22 a table top having two spaced sections 417 and 420, which form a transverse slot 421 therebetween, and there also being suitable trackways 422 mounted on the upper surfaces of the table top sections 417 and 420 adjacent opposed sides of the transverse slot 421 (Figure 22). The trackways 422 and the slot 421 are provided for reception of a suitable cutting device of any desired construction, not shown, which may be mounted on the table top, and which may be employed for cutting the folds of cloth W intermediate the folded ends thereof as in making blankets, bed sheets and the like.

Longitudinally extending angle bars 425, only one of which is shown in Figure 9, are suitably secured to the lower surfaces of the table top sections 417 and 420 to assist in supporting the same, and transverse angle bars 427 and 428 are also suitably secured to the lower surfaces of the table top sections 417 and 420, respectively. By referring to Figures 12 and 13, there may be observed the manner in which the ends of the angle bars 427 and 428 are adapted to support the weight of the table top sections 417 and 420, and the cloth W carried thereby.

Each of the ends of each of the angle bars 427 and 428 has a block 430 welded thereto (Figure 13) and these blocks 430 have the upper ends of shafts 431 and 432 and 433 and 434, respectively, welded thereto (Figures 1, 2, 12, and 13).

These guide rods 431, 432, 433, and 434 are each mounted for vertical sliding movement in spaced guide blocks 435 and 436 (Figures 12 and 13), there being a pair of these guide blocks 435 and 436 welded to the inner faces of each of the vertically disposed plates 390, 391, 404 and 405 (Figures 1, 2, 12 and 13).

It is thus seen that upon each revolution of the shaft 176 a stroke will be imparted to the pawl-carrying arm 350 (Figure 15) which, as it moves downwardly, will cause the ratchet pawl 355 to engage the ratchet wheel 352 thus imparting partial rotation in a counterclockwise direction to the same. Now, as the link 344 moves upwardly, the ratchet pawl 355 will be partially rotated about its axis by the teeth of the ratchet wheel 352 in a clockwise direction, so as to move past the teeth in the ratchet wheel 352. When the pointed end of the ratchet pawl 355 has moved clear of the teeth in its upward movement, the leaf spring member 362 will urge the ratchet pawl back to its normal position preparatory to again engaging the teeth in the ratchet wheel 352. The ratchet wheel is prevented from turning in a reverse direction by a strap iron member 437 whose free end rests against the teeth of the ratchet wheel 352 and whose other end is pivoted on a standard 438 (Figure 12) the lower end of which is welded to the channel bar 11 of the frame 10. Now, when partial rotation is transmitted to the ratchet wheel 352, this will turn the shaft 351 and the worm 373 thereon will transmit partial rotation to the worm gear 374 thus causing the link belts 382 and 383 to be moved downwardly in Figure 13.

Referring to Figure 9, it will be observed that downward movement of the belt 383 will cause the grooved wheels 385 and 401 to partially and intermittently rotate and this will cause the arms 406 and 407 to move in a counterclockwise direction thus moving the table top sections 417 and 420, which support the folded cloth W, downwardly slightly upon each movement of the guiding and folding bar 126 from one set of the gripper jaws 220 to the other set 220a or vice versa, thus insuring that the cloth will be stretched in a perfectly straight line from one set of jaws to the other which is a particularly important feature of this invention.

The cloth W or other pliable material in sheet form is usually taken from a suitable wheeled truck T although it is to be understood that the cloth may be taken from a roll or any other suitable device. The cloth extends upwardly from the truck T and passes over a non-rotatable roller 440 which is fixedly mounted at opposite ends thereof on the upper ends of the standards 57 and 58. The cloth W then passes upwardly and inwardly at an angle and passes over a second roller 442 journaled in suitable bearing blocks 443 (Figures 1 and 3) and which are suitably secured to right-angular brackets 445, of welded construction, which are, in turn, secured as by screws 447 to the strap iron members 51 and 52 heretofore described.

Figure 21:
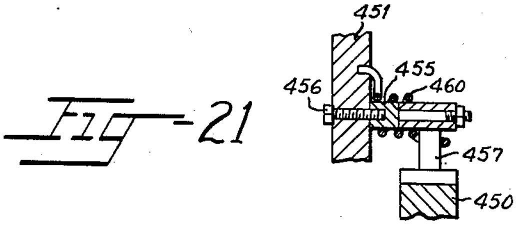
Figure 21 is an enlarged vertical sectional view taken substantially along the line 21—21 in Figure 20.

Referring to Figures 3 and 20, it will be observed that one of the restricted journaled ends of the roller 442 is indicated at 444 and has an overriding clutch mechanism mounted thereon which comprises a ratchet wheel 450 which is fixedly mounted on the journaled end of the roller 442 and which rotatably engages a pulley 451 rotatably mounted on the journaled end of the roller 442 and which is prevented from endwise movement thereon by a suitable collar 453 (Figure 3). The pulley 451, in this instance, is a spoked pulley and one of its spokes has a stub shaft 455 fixed thereon (Figure 21) as by a screw 456 and on which a ratchet pawl 457 is oscillatably mounted. The ratchet pawl 457 is normally biased into engagement with the periphery of the ratchet wheel 450 by a torsion spring 460 one end of which is connected to the spoke of the pulley 451 and the other end of which partially encircles the ratchet pawl 457 and is imbedded therein. The purpose of this overriding clutch mechanism will be later described.

The pulley 451 has a belt 462 mounted thereon which extends downwardly and forwardly in Figure 2 and is mounted on a relatively small pulley 463 rotatably mounted on a restricted end portion 464 of the roller 440 heretofore described. The small pulley 463 is suitably secured to a spoked pulley 465 of substantially larger diameter than the pulley 463 and which is also rotatably mounted on the restricted end portion of the roller 440.

This pulley 465 has a belt 466 mounted thereon which extends to a pulley 467 of a suitable variable speed transmission mechanism 470, the mechanism shown in Figure 2 being of a type manufactured by Lovejoy Flexible Coupling Co., 5000 West Trade Street, Chicago 44, Illinois, and which is known as an Ideal "Select-O-Speed" transmission and bears U. S. Patent Numbers 2,157,758 and 2,258,970.

The variable speed transmission mechanism 470 also has a pulley 471 on its other side as shown in Figure 4 on which a belt 472 is mounted. This belt 472 extends downwardly and is also mounted on a pulley 473 (Figure 4) mounted on a shaft of an electric motor 475 having electric wires 476 and 477 extending therefrom to a suitable source of electrical energy, not shown. The variable speed transmission mechanism 470 and the electric motor 475 are suitably secured on an angularly disposed channel bar frame member 480 welded to the ends of a suitable strap iron member 482 the other end of which is welded or secured in any suitable manner to the standard 58 (Figures 2 and 4).

It is thus seen that the electric motor 475 transmits rotation to the roller 442 (Figures 1, 2 and 3) thus pulling the cloth W from the truck T over the roller 440. The frictional contact of the cloth passing over the roller 440 will assist in maintaining tautness of the cloth W as it extends between the roller 440 and the roller 442. Now, inasmuch as the cloth W is not taken up by the guiding and folding bar 126 at the same rate of speed throughout its path of travel from one set of gripper jaws 220 to the other, the cloth W is at times pulled by the bar 126 at a slightly faster rate of speed than the roller 442 is driven, in the manner heretofore described. Therefore, the overriding clutch is provided to permit the roller 442 to move at a faster rate of speed than the pulley 451, in which instance, the ratchet wheel 450 in Figure 20 will move in a clockwise direction at a slightly faster rate of speed than the associated pulley 451 and will thus move away from the ratchet pawl 457.

Figure 18:
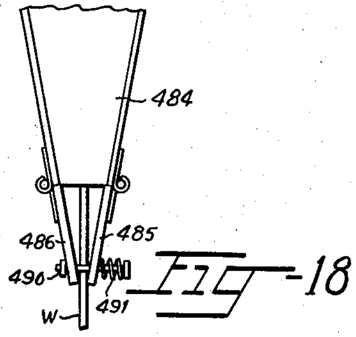
Figure 18 is an enlarged elevation of a portion of a guiding tension hopper taken looking substantially along the line 18—18 in Figure 5.

Now, the cloth W extends downwardly from the roller 442 and passes into a substantially V-shaped guide and tension hopper 484 which is open at its upper end and is restricted at its lower end, its lower end being provided with hinged plates 485 and 486 (Figures 1, 2 and 18). Each of the ends of the plates 485 and 486 are slidably penetrated by a bolt 490 which is surrounded by a suitable compression spring 491 disposed between the head of the bolt 490 and the plate 485 thus urging the plates 485 and 486 together at their lower ends. The hopper 484 is provided with stub shafts 493 at its upper end and disposed at opposed sides thereof and which are oscillatably mounted in bearing blocks 494 secured, as by screws 495, to the strap iron members 51 and 52 heretofore described. Oscillation is imparted to the hopper 484 in timed relation to oscillation of the guiding and folding bar 126 by a link 500 which is pivotally connected, as at 501, to the side of the hopper 484 nearest the observer in Figure 2.

This link 500 is connected at its rearmost end (Figure 2) to a crank arm 503 having a longitudinally extending slot 505 therein in which a pin 506 is mounted for longitudinal adjustment and on which the rear end of the link 500 is pivotally mounted. The arm 503 is fixedly mounted on one end of a shaft 510 rotatably mounted in bearing blocks 511 suitably secured to the upper ends of the U-shaped strap iron member 73 and the horizontally disposed portion 70 of the angle bars 67 (Figures 1, 2 and 5).

The shaft 510 has a sprocket wheel 515 fixedly mounted thereon on which a sprocket chain 516 is mounted. The sprocket chain 516 extends downwardly, in Figures 1, 2 and 5, and is mounted on a sprocket wheel 517 fixedly mounted on the jack shaft 163 heretofore described. It is thus seen that rotation is transmitted to the shaft 510 from the jack shaft 163 which, in turn, transmits rotation to the arm 503 in Figure 2 to cause the hopper 484 to oscillate on its axis 463 in timed relation to oscillation of the pivoted arms 102 and 103 in Figures 1 and 2.

Now, the purpose of the spring loaded hinged plates 485 and 486 at the lower end of the hopper 484 (Figures 1, 2 and 18) is to retard movement of the cloth W from the lower end of the hopper 484 to the guiding and folding bar 126 which is necessary due to the distance from the bar 126 to the lower end of the hopper 484 being variable throughout the path of travel of the guiding and folding bar 126. It is obvious that the guiding and folding bar 126 will pull the cloth W from the hopper 484 at a faster rate as it nears the extreme ends of its stroke than it will as it passes immediately adjacent the lower end of the hopper 484 and during the time that the bar 126 is closely adjacent the lower end of the hopper 484, the cloth will become slack within the confines of the hopper 484 temporarily due to the fact that the roller 442 is driven at an optimum speed coincident with the speed at which the cloth W is pulled from the lower end of the hopper 484 by the guiding and feeding bar 126.

In Figure 1, suitable weight arms 520 and 521 are shown which are fixed on the shafts 386 and 402, respectively, and each of which has a suitable weight member 522 depending from its free end. These weight arms 520 and 521 with their weight members 522 serve to counterbalance the weight of the table 416 so as to lessen the work of an operator in raising the table 416 after a batch of folded cloth has been removed therefrom and preparatory to a new batch of cloth being folded. The table is raised by manipulation of the crank handle 365 (Figures 12 and 13).

In the drawings and specification there has been set forth a preferred embodiment of the invention, and although specific terms are employed, they are used in a generic and descriptive sense only, and not for purposes of limitation, the scope of the invention being defined in the claims.

We claim:

1. A web folding machine comprising a pivoted reciprocating guiding and folding bar, a vertically movable table disposed below the path of travel of the reciprocating bar and the opposed ends of the table terminating a substantial distance short of the extreme ends of the stroke of the reciprocating bar, gripper devices disposed in spaced relation to the said opposed ends of the table and means for admitting cloth and the like to the reciprocating bar, said gripper devices comprising a fixed lower jaw and an upper movable jaw, means on the reciprocating bar for inserting a folded end of the web between the upper and lower jaws of the gripper devices alternately, means for latching the upper jaw in elevated position, means carried by the reciprocating bar for unlatching the upper jaw to allow it to move by gravity into engagement with the lower jaw of a particular gripper device upon a folded end of cloth being moved therebetween by the reciprocating bar and means on the gripper devices for automatically moving the upper jaw out of engagement with the lower jaw upon the reciprocating bar inserting a folded end of cloth in the other of the gripper devices whereby the cloth may be folded in successive folds across the table between the gripper devices, means operable automatically for wiping the folded end of the cloth from an adjacent set of gripper jaws after the movable jaw has moved out of engagement with the fixed jaw, and means operable automatically for lowering the table while folds of cloth are being deposited thereon.

2. A web folding machine comprising a pivoted reciprocating guiding and folding bar, a vertically movable table disposed below the path of travel of the reciprocating bar and the opposed ends of the table terminating a substantial distance short of the extreme ends of the stroke of the reciprocating bar, gripper devices disposed in spaced relation to the said opposed ends of the table and means for admitting cloth and the like to the reciprocating bar, said gripper devices comprising a fixed lower jaw and an upper movable jaw, means on the reciprocating bar for inserting a folded end of the web between the upper and lower jaws of the gripper devices alternately, means for latching the upper jaw in elevated position, means carried by the reciprocating bar for unlatching the upper jaw to allow it to move by gravity into engagement with the lower jaw of a particular gripper device upon a folded end of cloth being moved therebetween by the reciprocating bar and means on the gripper devices for automatically moving the upper jaw out of engagement with the lower jaw upon the reciprocating bar inserting a folded end of cloth in the other of the gripper devices whereby the cloth may be folded in successive folds across the table between the gripper devices, means automatically operable upon each stroke of the reciprocating bar in each direction for automatically lowering the table a predetermined amount thus permitting each fold of cloth, before being released by the gripper devices, to be held taut between the sets of gripper devices, and means operable automatically for wiping the folded ends of the cloth from between the gripper when the upper jaw is elevated.

3. In a cloth folding machine having a horizontally disposed table, means for placing cloth in superposed folds of predetermined length on the table comprising a pair of gripper devices, one each mounted adjacent each end of said table, said gripper devices comprising a fixed jaw and a movable jaw, a bar movable across said table and being slotted longitudinally thereof for the passage of the cloth, means on the bar for forming folded ends to the cloth and for directing said folded ends of the cloth to a position between the gripper jaws alternately, means for moving the gripper jaws to closed position to grip the folded ends of the cloth when the same have been moved to a position between the gripper jaws, means for wiping the folded end of the cloth from one of the gripper devices after a succeeding folded end of the cloth has been placed between and clamped by the jaws of the other of the gripper devices and means automatically operable upon each folded end being placed between the jaws of either of the gripper devices for intermittently lowering the table so that the uppermost fold of the cloth may be held in a taut straight line between the jaws of the pair of gripper devices.

4. In a cloth folding machine having a horizontally disposed table, means for placing cloth in superposed folds of predetermined length on the table comprising a pair of gripper devices, one each mounted adjacent each end of said table, said gripper devices comprising a fixed jaw and a movable jaw, a bar movable across said table and being slotted longitudinally thereof for the passage of the cloth, means on the bar for forming folded ends to the cloth and for directing said folded ends of the cloth to a position between the gripper jaws alternately, means on the gripper jaws for releasing the folded end of the cloth from one of the gripper devices after a succeeding folded end of the cloth has been placed between and clamped by the jaws of the other of the gripper devices and means automatically operable upon each folded end being placed between the jaws of either of the gripper devices for intermittently lowering the table so that the uppermost fold of the cloth may be held in a taut straight line between the jaws of the pair of gripper devices, means for feeding the cloth from a source to a point disposed in a vertical plane substantially in alinement with the center of each fold of the cloth after it is folded from which it is directed to the reciprocating bar, comprising a fixed roller disposed a substantial distance from and to one side of the horizontal plane above the table, a driven roller disposed at a higher elevation than the fixed roller and being disposed in a vertical plane substantially above the center of said table, an overriding clutch on the driven roller, a pivoted tension hopper disposed below the driven roller and being open at its upper end and being restricted at its lower end, means for transmitting oscillation to the hopper in timed relation to reciprocation of the guide bar, whereby the cloth may be fed from the source upwardly and over the fixed roller and may be pulled by the driven roller as it passes over the same and then downwardly through the reciprocating hopper and then to the guide bar for directing the folded ends of the cloth to the gripper devices.

5. In a cloth folding machine having a horizontally disposed table, means for placing cloth in superposed folds of predetermined length on the table comprising a pair of gripper devices, one each mounted adjacent each end of said table, said gripper devices comprising a fixed jaw and a movable jaw, a bar movable across said table and being slotted longitudinally thereof for the passage of the cloth, means on the bar for forming folded ends to the cloth and for directing said folded ends of the cloth to a position between the gripper jaws alternatively, means on the gripper jaws for releasing the folded end of the cloth from one of the gripper devices after a succeeding folded end of the cloth has been placed between and clamped by the jaws of the other of the gripper devices and means automatically operable upon each folded end being placed between the jaws of either of the gripper devices for intermittently lowering the table so that the uppermost fold of the cloth may be held in a taut straight line between the jaws of the pair of gripper devices, means for feeding the cloth from a source to a point disposed in a vertical plane substantially in alinement with the center of each fold of the cloth after it is folded from which it is directed to the reciprocating bar, comprising a fixed roller disposed a substantial distance from and to one side of the horizontal plane above the table, a driven roller disposed at a higher elevation than the fixed roller and being disposed in a vertical plane substantially above the center of said table, an overriding clutch on the driven roller, a pivoted tension hopper disposed below the driven roller and being open at its upper end and being restricted at its lower end, means for transmitting oscillation to the hopper in timed relation to reciprocation of the guide bar, whereby the cloth may be fed from the source upwardly and over the fixed roller and may be pulled by the driven roller as it passes over the same and then downwardly through the reciprocating hopper and then to the guide bar for directing the folded ends of the cloth to the gripper devices, spring loaded means at the lower end of the tension hopper for gripping the cloth as it passes therebetween and said reciprocating bar being adapted to travel in an arcuate path whereby excess cloth delivered by the driven roller to the hopper may be lodged therein and the cloth may remain taut between the discharge end of the hopper and the reciprocating bar and whereby upon the reciprocating bar withdrawing the cloth from the hopper and the driven roller at a faster rate than the rate of speed of rotation of the driven roller, the driven roller may move at a faster rate accordingly by virtue of the overriding clutch.

6. A cloth folding machine comprising a frame, a pivoted reciprocating guiding and folding bar mounted on the frame, said bar having a longitudinally extending slot therein through which the cloth is passed, a vertically movable table mounted within the frame for receiving a pile of folded cloth and automatic means for positioning the height of the table with respect to the position of the folded end of the cloth, gripper devices disposed adjacent opposed ends of the table, means on the gripper devices for automatically grasping a folded end of the cloth and means on the reciprocating bar for presenting folded ends of the cloth to the gripper devices, means on the reciprocating bar for guiding the cloth from one of the gripper devices to the other, and means adjacent the gripper devices for automatically wiping each fold of cloth admitted thereto upon a succeeding folded end being admitted to the other of the gripper devices.

7. A cloth folding machine comprising a table, a pivoted reciprocating guiding and folding bar mounted for movement above and longitudinally of the table, gripper devices disposed at opposed ends of the path of travel of the guiding and folding bar, means for opening and closing the gripper devices for clampingly receiving a folded end of the cloth from the guiding and folding bar and means automatically operable for releasing the folded end of the cloth from one of the gripper devices immediately after a folded end of the cloth has been admitted to the other of the gripper devices by the reciprocating bar, and means for wiping the released folded end of the cloth from between the gripper devices.

8. A cloth folding machine comprising a frame, a pivoted reciprocating guiding and folding bar mounted on the frame, said bar having a longitudinally extending slot therein through which the cloth is passed, a vertically movable table mounted within the frame for receiving a pile of folded cloth and automatic means for positioning the height of the table with respect to the position of the folded end of the cloth, gripper devices disposed adjacent opposed ends of the table, means on the gripper devices for automatically grasping a folded end of the cloth and means on the reciprocating bar for presenting folded ends of the cloth to the gripper devices, means on the reciprocating bar for guiding the cloth from one of the gripper devices to the other, means on the gripper devices for automatically releasing each fold of cloth admitted thereto upon a succeeding folded end being admitted to the other of the gripper devices, each of said gripper devices comprising a fixed jaw mounted on the frame and disposed above and remote from the ends of the table and a pivoted movable jaw normally resting on the fixed jaw, cam means automatically operable for raising the pivoted jaw in timed relation to the reciprocating bar presenting a folded portion of the cloth between the movable and the fixed jaws, means for latching the pivoted jaw in raised position, means on the reciprocating bar for automatically releasing the movable jaw upon the reciprocating bar admitting a folded end of the cloth between the movable jaw and the fixed jaw to cause the movable jaw to move downwardly by gravity thus clamping the folded end of the cloth between the same and the lower jaw as the reciprocating bar moves away from the gripper jaw.

9. A cloth folding machine comprising a frame, a pivoted reciprocating guiding and folding bar mounted on the frame, said bar having a longitudinally extending slot therein through which the cloth is passed, a vertically movable table mounted within the frame for receiving a pile of folded cloth and automatic means for positioning the height of the table with respect to the position of the folded end of the cloth, gripper devices disposed adjacent opposed ends of the table, means on the gripper devices for automatically grasping a folded end of the cloth and means on the reciprocating bar for presenting folded ends of the cloth to the gripper devices and means on the reciprocating bar for guiding the cloth from one of the gripper devices to the other, means on the gripper devices for automatically releasing each fold of cloth admitted thereto upon a succeeding folded end being admitted to the other of the gripper devices, each of said gripper devices comprising a fixed jaw mounted on the frame and disposed above and remote from the ends of the table and a pivoted movable jaw normally resting on the fixed jaw, cam means automatically operable for raising the pivoted jaw in timed relation to the reciprocating bar presenting a folded portion of the cloth between the movable and the fixed jaws, means controllable by the reciprocating bar for automatically releasing the movable jaws upon the reciprocating bar admitting a folded end of the cloth between the movable jaw and the fixed jaw to cause the movable jaw to move downwardly by gravity thus clamping the folded end of the cloth between the same and the lower jaw as the reciprocating bar moves away from the gripper jaw, means for wiping the folded end of the cloth from between the jaws of a particular gripper device after the jaws have opened and preparatory to a succeeding folded end of the cloth being admitted between the movable jaw and the fixed jaw comprising a wiper bar disposed in parallel relation to the gripper arms and means for moving the wiper arms downwardly past the open ends of the gripper jaws following admittance of a fold of the cloth by the reciprocating bar to the jaws of the other of the gripper devices and cam means for again raising the wiper bar above the path of travel of the reciprocating bar so a succeeding folded end of the cloth may be inserted between the associated gripper jaws whereby, upon the wiper bar moving downwardly, the wiper bar will engage the cloth adjacent its folded end thus withdrawing the folded end from between the fixed jaw and the movable jaw of the associated gripper device.

10. A cloth folding machine comprising a vertically movable table, a pair of gripper devices disposed each adjacent opposed ends of said table and comprising a fixed gripper jaw and a cooperating movable gripper jaw, means for directing the folded portion of a strip of cloth between first one set of the gripper jaws and then the other set of gripper jaws, means automatically operable upon a folded end of the cloth being inserted between one of the sets of gripper jaws for automatically lowering the movable jaw against the fixed jaw for clamping the cloth therebetween, means automatically operable upon a succeeding folded portion of the cloth being admitted to the other of the sets of gripper jaws to cause the vertically movable jaw on the other set of gripper jaws to move toward the fixed jaw thus clamping the other folded end of the cloth therebetween, means automatically operable upon the cloth being clamped between the jaws of the other of the gripper devices for automatically moving the movable jaw away from the fixed jaw of the first gripper devices, other means automatically operable for wiping the folded end of the cloth from between the adjacent set of gripper jaws after the movable jaw has moved out of engagement with the fixed jaw, and means automatically operable for lowering the table upon a layer of cloth being deposited thereon.

11. In a cloth folding machine having an elongated table, a cloth guiding member having a slot extending longitudinally thereof and provided with means for moving the same back and forth past both ends of the table, means for feeding a web of cloth through the slot in the cloth guiding member, said cloth guiding member having spaced edges parallel to each other, an upper movable gripping member beneath one edge of which the oscillating member is adapted to pass and disposed at each end of the table and in spaced relation to the ends of the table, a fixed gripping member at each end of the table and on which the movable gripping member is adapted to rest by gravity means for latching the upper gripping members in raised position until one of the edges of the cloth guiding member moves beneath the upper gripping member, means carried by the cloth guiding member for unlatching the upper gripping member and allowing it to fall by gravity onto a folded portion of the cloth placed thereunder by one of the edges of the oscillatable member, wiping means disposed above the upper gripping member and adapted to pass downwardly past the gripping members to remove the cloth from beneath the upper gripping member and means for raising the upper gripping member from out of contact with the cloth immediately prior to the wiping member being allowed to move downwardly past the lower gripping member to wipe the folded portion of the cloth therefrom.

12. In a cloth folding apparatus comprising a table, a cloth guiding member mounted for movement back and forth across the top of the table and having its path of movement extending beyond each end of the table, means for feeding a web of cloth through the cloth guiding member, said cloth guiding member having parallel spaced edges, a movable gripping member disposed at each end of the table and beneath which one of the edges carrying the cloth folded therearound is adapted to be moved, a stationary jaw below each gripping member, means for latching the gripping members in elevated position while one of the edges of the cloth guiding member with its cloth therearound moves beneath the same, means carried by the cloth guiding member for unlatching the gripping member and allowing it to fall downwardly onto the cloth to hold it on the jaw as the edge of the cloth guiding member moves from beneath the gripping member, a wiping member mounted above the gripping member and having movement downwardly past the proximate edges of the gripping member, means for latching the wiping member in elevated position until the gripping member has been allowed to fall downwardly onto a folded end of the cloth and means for allowing the wiping member to fall downwardly by gravity past the gripping member when the gripping member has been elevated to wipe the cloth from beneath the same.

13. In a cloth folding apparatus comprising a table, a cloth guiding member mounted for movement back and forth across the top of the table and having its path of movement extending beyond each end of the table, means for feeding a web of cloth through the cloth guiding member, said cloth guiding member having parallel spaced edges, a movable gripping member disposed at each end of the table and beneath which one of the edges carrying the cloth folded therearound is adapted to be moved, a stationary jaw below each gripping member, means for latching the gripping members in elevated position while one of the edges of the cloth guiding member with its cloth therearound moves beneath the same, means carried by the cloth guiding member for unlatching the gripping member and allowing it to fall downwardly onto the cloth to hold it on the jaw as the edge of the cloth guiding member moves from beneath the gripping member, a wiping member mounted above the gripping member and having movement downwardly past the proximate edges of the gripping member, means for latching the wiping member in elevated position until the gripping member has been allowed to fall downwardly onto a folded end of the cloth and means for allowing the wiping member to fall downwardly by gravity past the gripping member when the gripping member has been elevated to wipe the cloth from beneath the same, said table being vertically movable and means driven in timed relation to the travel of the cloth guiding member back and forth across the table for intermittently lowering the table to compensate for the thickness of the folds of cloth thereon.

14. A cloth folding machine comprising a table, a pivoted reciprocating guiding and folding bar mounted for movement above the table and longitudinally of the table and having a path of travel extending beyond each end of the table, gripper devices disposed adjacent both ends of the table and in the path of travel of the guiding and folding bar, said gripper devices comprising a lower fixed gripper and an upper movable gripper, said guiding and folding bar having a longitudinally extending slot therethrough through which a web of cloth is adapted to be passed, means for feeding the cloth to the guiding and folding bar, means automatically operable for raising the upper gripper to receive the folded end of cloth, and means for allowing the upper gripper to fall onto the fixed gripper for clamping the folded end of the cloth, means automatically operable for raising the upper gripper for releasing the folded end of the cloth from one of the gripper devices immediately after a folded end of the cloth has been admitted to the other of the gripper devices at the other end of the table and means automatically operable for wiping a folded end of the cloth from beneath a released an upper gripper to allow the folded end of the cloth to fall downwardly past that end of the table.

15. A web folding machine comprising a pivoted reciprocating guiding and folding bar, a vertically movable table disposed below the path of travel of the reciprocating bar and the opposed ends of the table terminating a substantial distance short of the extreme ends of the stroke of the reciprocating bar, gripper devices disposed in spaced relation to the said opposed ends of the table and means for admitting cloth and the like to the reciprocating bar, said gripper devices comprising a fixed lower jaw and an upper movable jaw, means on the reciprocating bar for inserting a folded end of the web between the upper and lower jaws of the gripper devices alternately, means for latching the upper jaw in elevated position, means carried by the reciprocating bar for unlatching the upper jaw to allow it to move by gravity into engagement with the lower jaw of a particular gripper device upon a folded end of cloth being moved therebetween by the reciprocating bar and means on the gripper devices for automatically moving the upper jaw out of engagement with the lower jaw upon the reciprocating bar inserting a folded end of cloth in the other of the gripper devices whereby the cloth may be folded in successive folds across the table between the gripper devices, means for wiping the folded end of the cloth from beneath the upper movable jaw and the fixed jaw of a gripper device upon the upper movable jaw being raised out of contact with the folded end of the cloth.

16. A web folding machine comprising a pivoted reciprocating guiding and folding bar, a vertically movable table disposed below the path of travel of the reciprocating bar and the opposed ends of the table terminating a substantial distance short of the extreme ends of the stroke of the reciprocating bar, gripper devices disposed in spaced relation to the said opposed ends of the table and means for admitting cloth and the like to the reciprocating bar, said gripper devices comprising a fixed lower jaw and an upper movable jaw, means on the reciprocating bar for inserting a folded end of the web between the upper and lower jaws of the gripper devices alternately, means for latching the upper jaw in elevated position, means carried by the reciprocating bar for unlatching the upper jaw to allow it to move by gravity into engagement with the lower jaw of a particular gripper device upon a folded end of cloth being moved therebetween by the reciprocating bar and means on the gripper devices for automatically moving the upper jaw out of engagement with the lower jaw upon the reciprocating bar inserting a folded end of cloth in the other of the gripper devices whereby the cloth may be folded in successive folds across the table between the gripper devices, means for wiping the folded end of the cloth from beneath the upper movable jaw and the fixed jaw of a gripper device upon the upper movable jaw being raised out of contact with the folded end of the cloth, means automatically operable upon each stroke of the reciprocating bar in each direction for automatically lowering the table a predetermined amount thus permitting each fold of cloth, before being released by the gripper devices, to be held taut between the sets of gripper devices.

17. A web folding machine comprising a pivoted reciprocating guiding and folding bar, a vertically movable table disposed below the path of travel of the reciprocating bar and the opposed ends of the table terminating a substantial distance short of the extreme ends of the stroke of the reciprocating bar, gripper devices disposed in spaced relation to the said opposed ends of the table and means for admitting cloth and the like to the reciprocating bar, said gripper devices comprising a fixed lower jaw and an upper movable jaw, means on the reciprocating bar for inserting a folded end of the web between the upper and lower jaws of the gripper devices alternately, means for elevating the upper movable jaw, means for latching the upper jaw in elevated position, means carried by the reciprocating bar for unlatching the upper jaw to allow it to move by gravity into engagement with the lower jaw of a particular gripper device upon a folded end of cloth being moved therebetween by the reciprocating bar and means for wiping a folded end of the cloth out of engagement with the lower jaw upon the reciprocating bar inserting a folded end of cloth in the other of the gripper devices whereby the cloth may be folded in successive folds across the table between the gripper devices, the reciprocating bar being slotted longitudinally and through which slot a web is adapted to be passed for presentation to the gripper devices, and means for oscillating a reciprocating bar to present one of its edges at a time to a gripper device.

18. A web folding machine comprising a pivoted reciprocating guiding and folding bar, a vertically movable table disposed below the path of travel of the reciprocating bar and the opposed ends of the table terminating a substantial distance short of the extreme ends of the stroke of the reciprocating bar, gripper devices disposed in spaced relation to the said opposed ends of the table and means for admitting a web of cloth and the like to the reciprocating bar, the reciprocating bar being slotted longitudinally and through which the web is adapted to be passed for presentation to the gripper devices said gripper devices comprising a fixed lower jaw and an upper movable jaw, means for elevating the upper movable jaw, means for latching the upper jaw in elevated position, means on the reciprocating bar for inserting a folded end of the web between the upper and lower jaws of the gripper devices alternately, means carried by the reciprocating bar for unlatching the upper jaw to allow it to move by gravity into engagement with the lower jaw of a particular gripper device upon a folded end of cloth being moved therebetween by the reciprocating bar, and means for wiping the folded ends of the cloth from a gripper device when released by the gripper jaws of a gripper device.

19. A cloth folding machine comprising a table and gripper devices disposed adjacent each end of the table but being remote from the ends of the table and being disposed at a slightly higher plane than the plane of the table, each of said gripper devices comprising a lower fixed gripper and an upper movable gripper, the upper gripper normally resting on the lower gripper, means for raising the upper grippers for conditioning the gripper devices to receive the folded portion of the cloth upon its presentation thereto, a reciprocating and oscillating bar having a slot disposed longitudinally thereof and through which the cloth is passed, means for moving the reciprocating and oscillating bar from first one set of gripper devices to the other set of gripper devices to deposit the cloth beneath a raised gripper, means automatically operable for gripping the folded portion of the cloth at one end of the table until a folded portion of the cloth has been presented to the other gripper device at the other end of the table, means automatically operable for the upper gripper for releasing the cloth from the gripper devices, and other means automatically operable for wiping the cloth from the grippers and allowing the folded portions thereof to fall downwardly past the end of the table associated therewith.

20. A cloth folding machine comprising a table and gripper devices disposed adjacent each end of the table but being remote from the ends of the table and being disposed at a slightly higher plane than the plane of the table, a reciprocating and oscillating bar having a slot disposed longitudinally thereof and through which slot the cloth is passed, means for moving the reciprocating and oscillating bar from first one set of grippers to the other set of grippers to present the cloth to a set of gripper devices, each of the gripper devices comprising a lower gripper and an upper gripper, means automatically operable for separating the grippers to receive the folded portion of the cloth upon its presentation thereto, means automatically operable for moving the grippers towards each other for gripping the folded portion of the cloth at one end of the table until a folded portion of the cloth has been presented to the other gripper device at the other end of the table, means automatically operable for separating the grippers to release the cloth from the grippers, other means automatically operable for wiping the cloth from the gripper devices and allowing the folded portions thereof to fall downwardly past the end of the table associated therewith, and means automatically operable upon a fold of cloth being placed upon the table for intermittently lowering the elevation of the table to thereby cause the top folds of the cloth to be disposed substantially at all times in the same plane.

GROVER C. TRUSLOW.
JOHN T. MacISAAC, Jr.

REFERENCES CITED

The following references are of record in the file of this patent:

UNITED STATES PATENTS

| Number | Name | Date |
|---|---|---|
| 56,048 | Heywood | July 3, 1866 |
| 604,749 | Hall | May 31, 1898 |
| 2,016,539 | Brenn | Oct. 8, 1935 |
| 2,359,417 | Hand | Oct. 3, 1944 |

FOREIGN PATENTS

| Number | Country | Date |
|---|---|---|
| 293,720 | Germany | Aug. 25, 1916 |